(12) United States Patent
Spiess et al.

(10) Patent No.: US 9,786,108 B2
(45) Date of Patent: Oct. 10, 2017

(54) NFC BASED SECURE CAR KEY

(71) Applicant: NXP B.V., Eindhoven (NL)

(72) Inventors: Bernhard Spiess, Gratkorn (AT);
Ulrich Neffe, Gratkorn (AT)

(73) Assignee: NXP B.V., Eindhoven (NL)

( * ) Notice: Subject to any disclaimer, the term of this patent is extended or adjusted under 35 U.S.C. 154(b) by 49 days.

(21) Appl. No.: 14/729,432

(22) Filed: Jun. 3, 2015

(65) Prior Publication Data

US 2016/0358396 A1 Dec. 8, 2016

(51) Int. Cl.
*G07C 9/00* (2006.01)
*H04B 5/00* (2006.01)
*B60R 25/24* (2013.01)

(52) U.S. Cl.
CPC ....... *G07C 9/00309* (2013.01); *H04B 5/0025* (2013.01); *B60R 25/24* (2013.01); *G07C 9/00007* (2013.01); *G07C 2009/00769* (2013.01); *G07C 2009/00865* (2013.01); *G07C 2009/00984* (2013.01)

(58) Field of Classification Search
CPC ...... G07C 2009/00865; G07C 9/00007; G07C 2009/00984; G07C 2209/64; G07C 9/00309; B60R 25/24; B60R 2325/205; H04B 5/0025

USPC ........................................................ 340/5.61
See application file for complete search history.

(56) References Cited

U.S. PATENT DOCUMENTS

| 9,015,075 B2* | 4/2015 | Hughes ............... G06F 21/31 |
| | | 700/286 |
| 2003/0233550 A1* | 12/2003 | Brickell ............... G06F 21/85 |
| | | 713/171 |
| 2013/0099892 A1 | 4/2013 | Tucker et al. |
| 2013/0298208 A1* | 11/2013 | Ayed ....................... G06F 21/00 |
| | | 726/6 |
| 2014/0266922 A1* | 9/2014 | Jin ........................ H01Q 21/28 |
| | | 343/702 |
| 2015/0044968 A1* | 2/2015 | Dobyns ................ H04B 5/0081 |
| | | 455/41.1 |
| 2016/0143004 A1* | 5/2016 | Stromberg ............ H04W 72/04 |
| | | 370/329 |
| 2016/0241543 A1* | 8/2016 | Jung ..................... H04L 63/083 |

* cited by examiner

*Primary Examiner* — Benyam Haile
(74) *Attorney, Agent, or Firm* — Rajeev Madnawat

(57) ABSTRACT

A device is disclosed. The device includes a processor and a memory. The memory is coupled to the processor and having programming instructions to operate a vehicle via Near Field Communication (NFC). The device also includes a NFC controller coupled to a short range antenna, a passive NFC tag and a secure memory coupled to the NFC controller for storing a security code.

18 Claims, 1 Drawing Sheet

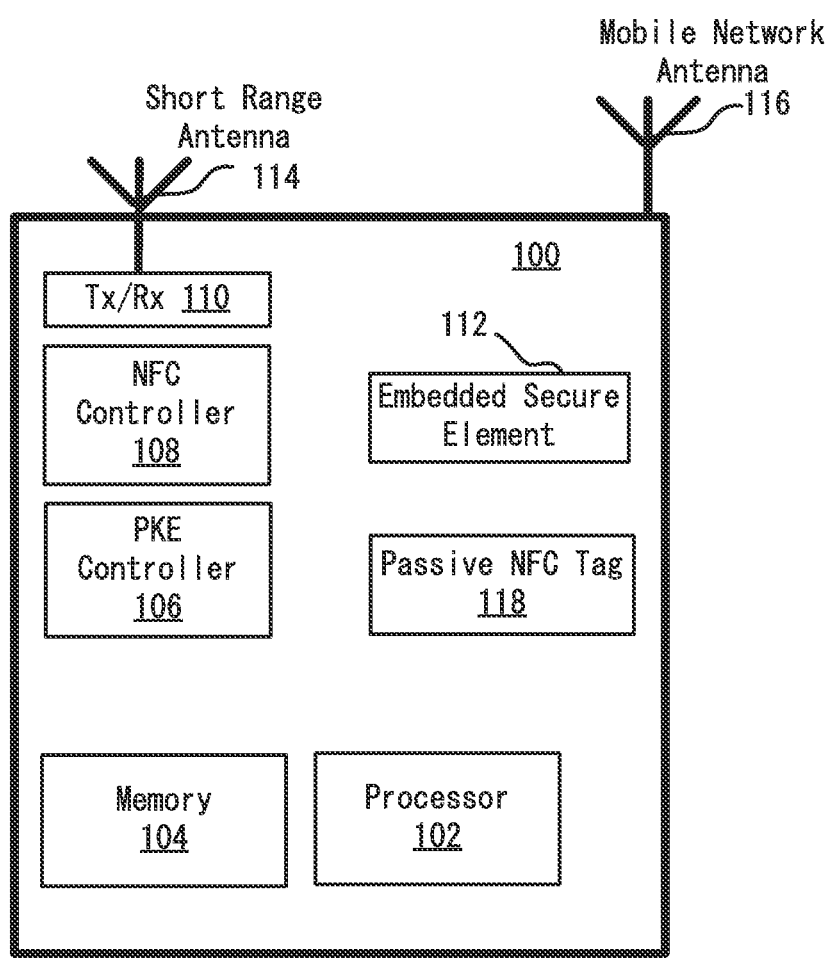

NFC BASED SECURE CAR KEY

BACKGROUND

In modern passenger vehicles such as passenger cars, traditional keys have been replaced by electronic key systems such as remote keyless systems (RKE) and passive entry systems (PKE). A typical RKE system has a wireless transmitter and a microcontroller (MCU) embedded in the car keys. The MCU mostly stays in sleep mode to save power. When a car key button is pressed, the MCU wakes up and instructs the transmitter to send out a (for example) 64-bit or 128-bit data stream after carrier modulation. An installed radio frequency (RF) receiver receives the data and forwards it to another MCU that verifies the sender's identity and instructs the mechanism to unlock the doors. Key fobs with multiple buttons can perform several other tasks such as opening the trunk, blinking the lights, triggering an alarm, and even starting the engine. The fob transmitter in RKE solutions typically operates at either 315 or 433.92 MHz.

The digital data stream, transmitted typically between 2.4 and 20 kbits/s, usually consists of a data preamble, a command code, some check bits, and a "rolling code" that ensures vehicle security by altering itself with each use. Without this rolling code, the transmitted signal might accidentally unlock another vehicle or be intercepted by a car thief who could use it to gain entry later.

Several major objectives govern the design of these RKE systems. Like all mass-produced automotive components, they must offer high reliability at low cost. They should minimize power drain in both the transmitter and receiver. In addition, the RKE system designer must juggle receiver sensitivity, carrier tolerance, and other technical parameters to achieve maximum transmission range within the constraints imposed by low cost and minimum supply current.

A typical PKE enables users to unlock a vehicle door or trunk without pressing any buttons. They are based on a low-frequency/radio-frequency (LF/RF) communication link between the fob and the vehicle. LF antennas mounted within the outside mirrors or door handles (for example) initiate communication and can sense multiple fobs at a typical range of 1.5 to 2 m. The keys use rolling security codes for authentication to prevent a key from operating a vehicle not associated with the key. PKE solutions can use a 125-kHz RFID transceiver to authenticate the fob and establish communication via the UHF link. When the user pulls a door handle, the passive entry controller sends an LF challenge to authenticate the driver's fob. The fob then sends an RF response to the controller. If fob recognition is successful, the vehicle automatically opens after a few milliseconds. Vehicles with a PKE system disengage the immobilizer and activate the ignition without the key in the ignition, provided the driver has the key inside the car.

Drivers then can start most vehicles with a PKE system by pressing a starter button or twisting an ignition switch. Also, they can lock these vehicles by pressing a button on one of the door handles, by touching a capacitive area on a door handle, or by simply walking away. The locking method varies between models. In any PKE system, a key fob must be able to measure the LF signal strength usually on three orthogonal axes (x, y, and z) and transmit this information via an RF channel. This signal strength information, also known as received signal strength indicator (RSSI), is collected using the antenna coils connected to the LF receiver. Any data such as a wakeup data pattern (preamble, ID) used as a payload in the protocol is received and passed to the key fob MCU for processing. The LF receiver includes dedicated control logic that can check wakeup signals with very low power consumption.

A backup mode enables the use of the PKE system even when the key fob battery is low, with power supplied to the device via the LF signal. The device's response is then transmitted by modulation of the vehicle's own LF signal. When used in this backup mode, the key fob device must be placed close to the door antenna for entry and exit or in a special area on the dashboard to start the vehicle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein address the use of Near Field Communication (NFC) in a mobile device or a wearable device such as mobile device accessory watches, activity tracking systems, etc. to enable such devices to be used as electronic keys.

In one embodiment, a device is disclosed. The device includes a processor and a memory. The memory is coupled to the processor and having programming instructions to operate a vehicle via Near Field Communication (NFC). The device also includes a NFC controller coupled to a short range antenna, a passive NFC tag and a secure memory coupled to the NFC controller for storing a security code. The NFC controller is coupled to the short range antenna through a transceiver that includes at least one of a variable capacitor and a variable resister. The passive NFC tag is enabled to communicate with an external NFC reader directly without the short range antenna. The secure memory is designed to self-destruct if an unauthorized access to the security code is attempted. A passive entry system (PKE) controller coupled to the short range antenna is included to operate the vehicle. The memory includes programming instructions to provision the device to be used as a key to operate the vehicle. The provisioning includes securely exchanging the security code with the vehicle. The secure memory includes a NFC control applet for controlling operations of the NFC controller.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

FIG. 1 is schematic of a portion of a device in accordance with one or more embodiments of the present disclosure;

DETAILED DESCRIPTION

Near Field Communication (NFC) is a short-range wireless technology that facilitates the secure exchange of data.

NFC is being increasingly adopted for secure transactions, including use by mobile phone manufacturers to create an "electronic wallet." NFC combined with an embedded secure element offers consumers a high level of convenience, interactivity, and security with their mobile devices. NFC typically operates at 13.56 MHz at rates ranging from 106 to 424 kbits/s. Therefore, it is possible to use NFC-enabled smart phones for RKE functions.

FIG. 1 illustrates a schematic of a mobile device 100. The mobile device 100 includes a processor 102 and a memory 104. The memory 104 is configured to store programming instructions to perform operations based on the nature of programming instructions. For example, at least some programming instructions may implement a user application to perform data exchange with an external device via one or more communication channels and protocols.

The mobile device 100 may include a passive keyless entry (PKE) controller 106 that is controllable via a mobile key application stored in the memory 104. The PKE controller 106 may be used to perform operations on a vehicle remotely. The mobile key application may include a secure key that is unique to operate a particular vehicle. In some embodiments, the mobile key application may be provisioned to work with the particular vehicle by storing a same encryption key both in the memory 104 (in the area that is accessible to the mobile key application) and a PKE controller in the particular vehicle. The mobile device 100 and the vehicle based PKE controller can then communicate securely by encrypting/decrypting data via the stored encryption key. In some embodiments, a public-private-key mechanism (e.g., public key infrastructure or PKI) may also be used instead of using the shared security or encryption key. In a PKI based security mechanism, the vehicle based PKE controller includes a digital certificate having a private and a public key. The public key of this certificate is stored in the mobile device 100 during a provisioning of the mobile device 100 to work with the particular vehicle. Similarly, the mobile device 100 includes its own digital certificate having a private and a public key. The public key of the mobile device 100 is provided to the vehicle based PKE controller. The data communication between the vehicle based PKE controller and the mobile device 100 is then encrypted using the destination's public key. The destination (e.g., the vehicle based PKE controller or the mobile device 100 depending on the direction in which the data is being sent) can use its own private key to decrypt the data.

The provisioning step to store either a symmetric key or digital certificates as noted above ensures that the particular vehicle can be operated using a desired provisioned mobile device only. If data communication is sent to the vehicle based PKE controller from a mobile device that is not provisioned to work with the particular vehicle, the vehicle based PKE controller will not be able to decrypt the received data, hence will not be able to follow control commands embedded in the received communication.

Typically, the traditional key fobs that are used for remote keyless entry stay in a low power mode to preserve battery power. A key fob is transitioned into the normal power mode when the vehicle based PKE controller sends a wake up pattern (WUP) to the key fob. In some embodiments however, in the mobile device 100 based key as described herein, a WUP based method may not be needed because the mobile device 100 based key may be activated when a mobile key application is activated in the mobile device 100. In other embodiments, when a WUP based approached may be used in the mobile device 100 based key implementation to automatically activate the mobile key application. In such embodiments, when the WUP is received by the mobile device 100, the mobile key application is automatically activated, for example through a push message, and a user interface of the mobile key application is displayed to the user.

In some embodiments, the mobile device 100 may include a hardware based PKE controller 106 that may perform communicate with the vehicle based PKE controller without a use of a mobile key application with a graphical user interface (GUI). In one or more embodiments, to eliminate a need for a mobile key application with a GUI, one or more of mobile device buttons (e.g., volume buttons, home button, etc.) may be mapped to perform pre-selected PKE operations through the PKE controller 106. In some embodiments, the mobile device 100 includes a short range antenna 114 in addition to the mobile network (UHF) antenna 116. In one embodiment, the short range antenna 114 is used for the communication with the vehicle based PKE controller only. It should be noted that the short range antenna 114 and the mobile network antenna 116 may be internal antennas of external antennas. In some embodiments, the short range antenna 114 is tunable using at least one of a variable capacitor, a variable resister, a variable inductor that are incorporated in the wireless device 100 (e.g., in the transceiver 110). Tuning of the short range antenna 114 may be used to change the range of communication.

The mobile device 100 may also include a NFC controller 108 and an embedded secure element 112. The embedded secure element 112 resides in a secure crypto chip and used for storing one or more security codes. The embedded security element 112 may also be used for storing configurations and/or encryption programming instructions. The embedded secure element 112 may include a NFC control applet. The NFC control applet may provide security features such as generating a security code or authorizing a security code. In some embodiments, the NFC control applet may connect to an external service via the Internet to obtain or authorize a security code from an external secure storage or system. In some embodiments, the NFC controller 118 may also communicate with a vehicle based NFC controller without the use of the short range antenna 114 using the Internet.

The mobile device 100 may also include a passive NFC tag 118 which may be used to perform at least some operations on the vehicle based PKE controller when the mobile phone 100 is out of battery or turned off. For example, via a NFC reader installed on the outer edge of the vehicle, the vehicle based PKE controller may read the security information contained in the passive NFC tag 118 and if the passive NFC tag 118 contains the security information that associates that security information to the particular vehicle, the vehicle based PKE controller may unlock a vehicle door or allow vehicle start when the passive NFC tag 118 is brought near a NFC reader installed in the vehicle.

A transceiver (TX/RX) 110 coupled to the short range antenna 114 is provided for enabling the NFC controller 108 or the PKE controller 106 to communicate with the vehicle based PKE controller via the short range antenna 114.

Since the mobile device 100 must be provisioned to be used with the particular vehicle, the mobile device 100 is configured to perform a provisioning operation. The process of provisioning the mobile device 100 to work with the particular vehicle involves securely storing a shared security or encryption key both in the mobile device 100 and the vehicle based PKE controller (or any associated security controller or memory in the vehicle). In one embodiment, the mobile device 100 is brought near a NFC controller installed inside the vehicle cabin. The distance between the mobile device 100 and the NFC controller inside the vehicle may be a couple of centimeters in order for the provisioning operation to work. In some embodiments, when the mobile phone 100 is within NFC communication range without the use of the short range antenna 114, the user enters a security code associated with the vehicle in the mobile device 100. The NFC controller 108 encrypts a message using the entered security code and send a provisioning request to the vehicle's NFC controller. The vehicle's NFC controller attempts to decrypt the message using the entered security code. In one embodiment, the NFC controller 108 includes a second security code in the message. If the vehicle based NFC controller is successful in decrypting the message, the vehicle based NFC controller generates a shared security code and sends it back to the mobile device 100 after encrypting the shared security code using the second security code. The shared security code is then security stored both in the vehicle based secure storage and in the embedded security element 112. The shared security code stored in the vehicle base secure storage may be deleted by the user and the mobile device 100 may be re-provisioned. Similarly, the shared security code stored in the mobile device 100 may be deleted by the user. In some embodiment, the mobile device 100 is configured to store a plurality of shared security codes, each associated with different vehicles. If a plurality of shared security codes are stored in the mobile device 100, in some embodiments, a trial and error mechanism may be employed to find the correct shared security code for a particular vehicle. A software in the mobile device 100 may also keep track of the usage of different shared security codes and start out the trial and error mechanisms using the most used shared security code first and then the second most used shared security code. In some embodiments, the vehicle stores the identity of the mobile device 100 during the provisioning process to keep track of all provisioned mobile devices that are authorized to operate the vehicle. To prevent a stolen key to be used by an unauthorized device, in some embodiments, the vehicle will reject a command from a mobile device if the mobile device is not found to be in the list of provisioned devices.

In one embodiment, the Passive NFC tag 118 and the NFC controller 108 may be incorporated in a wearable device (such as Fitbit™, Apple Watch™). The wearable device is configured to be coupled to the mobile device 100 via a suitable communication protocol such as Bluetooth™. The embedded secure element 112 may also be incorporated in a wearable device.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A device, comprising:
   a processor;
   a memory coupled to the processor and having programming instructions to operate a vehicle via Near Field Communication (NFC);
   a user interface to receive a security code associated with a particular vehicle from a user;
   a NFC controller coupled to a short range antenna, the NFC controller configured to encrypt a message using the entered security code, the message including a second security code and sending a request including the encrypted message to a vehicle for authorization;
   a passive NFC tag; and
   a secure element memory coupled to the NFC controller configured to store one or more security codes, the secure element memory storing and receiving from the vehicle upon successful decryption of the message a shared security code encrypted with the second security code.

2. The device of claim 1, wherein the NFC controller is coupled to the short range antenna through a transceiver that includes at least one of a variable capacitor and a variable resistor.

3. The device of claim 1, wherein the passive NFC tag is enabled to communicate with an external NFC reader directly without the short range antenna.

4. The device of claim 1, wherein the secure element memory is designed to self-destruct if an unauthorized access to the security code is attempted.

5. The device of claim 1, further includes a passive entry system (PKF) controller coupled to the short range antenna to operate the vehicle.

6. The device of claim 1, wherein the memory includes programming instructions to provision the device to be used as a key to operate the vehicle.

7. The device of claim 6, wherein the provisioning includes securely exchanging the security code with the vehicle.

8. The device of claim 1, wherein the secure element memory includes a NFC control applet configured to control operations of the NFC controller.

9. The device of claim 1, wherein the shared security code stored in the secure element memory includes one of the plurality of security codes sent from the NFC controller.

10. The device of claim 1, wherein the secure element memory stores encryption programming instructions to be executed by the NFC controller.

11. The device of claim 1, wherein the NFC controller includes a NFC control applet configured to provide security features including generating a security code or authorizing a security code.

12. The device of claim 11, wherein the NFC applet connects to an external service to obtain a security code from an external secure system.

13. The device of claim 1, wherein the one or more security codes includes a security code associated with the vehicle.

14. The device of claim 1, wherein the one or more security codes includes a shared security code provided by the NFC controller.

15. A device, comprising:
- a processor;
- a memory coupled to the processor and having programming instructions to operate a vehicle via Near Field Communication (NFC);
- a user interface to receive a security code associated with a particular vehicle from a user;
- a NFC controller coupled to a short range antenna, the NFC controller configured to encrypt a message using the entered security code, the message including a second security code, and sending a request including the encrypted message to at least one of a plurality of vehicles for authorization;
- a passive NFC tag; and
- a secure element memory coupled to the NFC controller configured to store a plurality of shared security codes, each shared security code associated with one of the plurality of different vehicles, wherein upon successful decryption of the message the secure element memory receives and stores one of the shared security codes encrypted with a second security code.

16. The device of claim 15, wherein the one of the shared security codes is a code shared between the device and at least one of the plurality of vehicles.

17. The device of claim 15, wherein the device includes a trial and error mechanism configured to find a shared security code for a vehicle.

18. The device of claim 17, wherein the device keeps track of a usage of different shared security codes and begins the trial and error mechanism using a most used security code followed by a second most used security code.

* * * * *